United States Patent
Somasundaran et al.

(10) Patent No.: US 10,339,826 B1
(45) Date of Patent: Jul. 2, 2019

(54) SYSTEMS AND METHODS FOR DETERMINING THE EFFECTIVENESS OF SOURCE MATERIAL USAGE

(71) Applicant: Educational Testing Service, Princeton, NJ (US)

(72) Inventors: Swapna Somasundaran, Plainsboro, NJ (US); Martin Chodorow, New York, NY (US); Jill Burstein, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 57 days.

(21) Appl. No.: 15/291,400

(22) Filed: Oct. 12, 2016

Related U.S. Application Data

(60) Provisional application No. 62/240,789, filed on Oct. 13, 2015.

(51) Int. Cl.
　*G09B 7/02*　　　(2006.01)
　*G06F 17/27*　　(2006.01)
　*G09B 19/00*　　(2006.01)

(52) U.S. Cl.
　CPC .......... *G09B 7/02* (2013.01); *G06F 17/2735* (2013.01); *G09B 19/00* (2013.01)

(58) Field of Classification Search
　CPC ........ G09B 7/02; G09B 19/00; G06F 17/2735
　See application file for complete search history.

(56) References Cited

U.S. PATENT DOCUMENTS

| | | | |
|---|---|---|---|
| 7,831,196 B2 * | 11/2010 | Attali | G09B 7/02 434/353 |
| 2004/0175687 A1 * | 9/2004 | Burstein | G06F 17/27 434/353 |
| 2005/0142529 A1 * | 6/2005 | Andreyev | G09B 7/00 434/362 |
| 2005/0143971 A1 * | 6/2005 | Burstein | G06F 17/274 704/4 |
| 2006/0172276 A1 * | 8/2006 | Higgins | G09B 7/00 434/362 |
| 2006/0240390 A1 * | 10/2006 | Attali | G09B 7/02 434/156 |

(Continued)

OTHER PUBLICATIONS

Beigman Klebanov, Beata, Madnani, Nitin, Burstein, Jill, Somasundaran, Swapna; Content Importance Models for Scoring Writing From Sources; Proceedings of the 52nd Annual Meeting of the Association for Computational Linguistics; Baltimore, MD; pp. 247-252; Jun. 2014.

(Continued)

*Primary Examiner* — Jason Skaarup
(74) *Attorney, Agent, or Firm* — Jones Day

(57) ABSTRACT

Systems and methods are provided for automatically scoring essay responses to a prompt using a scoring model. A relevant word corpus and an irrelevant word corpus are accessed. A scoring model is generated by, for each of a plurality of words in the relevant word corpus, determining a topic signature score based on a number of appearances of that word in the relevant word corpus and a number of appearances of that word in the irrelevant word corpus. For each of a plurality of words in an essay response, a topic signature score is determined for that word. A score for the essay response is determined based on the identified topic signature scores.

20 Claims, 9 Drawing Sheets

(56) References Cited

U.S. PATENT DOCUMENTS

| | | | | |
|---|---|---|---|---|
| 2009/0326916 A1* | 12/2009 | Gao | ............... | G06F 17/277 704/4 |
| 2013/0179766 A1* | 7/2013 | Madnani | ............... | G06F 17/241 715/230 |
| 2014/0278375 A1* | 9/2014 | Ahmad | ............... | G06F 17/2785 704/9 |
| 2015/0243181 A1* | 8/2015 | Somasundaran | ........ | G09B 7/02 434/167 |
| 2015/0248397 A1* | 9/2015 | Burstein | ............... | G06F 17/279 704/9 |
| 2015/0254229 A1* | 9/2015 | Beigman Klebanov | ............... | G09B 5/06 434/353 |
| 2015/0254565 A1* | 9/2015 | Beigman Klebanov | ............... | G06F 17/2785 706/12 |

OTHER PUBLICATIONS

Blanchard, Daniel, Heilman, Michael, Madnani, Nitin; SciKit-Learn Laboratory; GitHub repository, https://github.com/EducationalTestingService/skll.; 2013.

Parker, Robert, Graff, David, Kong, Junbo, Chen, Ke, Maeda, Kazuaki; English Gigaword Fourth Edition, LDC2009T13; Linguistic Data Consortium; 2009.

Porter, M.F.; Snowball: A Language for Stemming Algorithms; http://snowball.tartarus.org/texts/introduction.html; Oct. 2001.

* cited by examiner

|  | Relevant | Irrelevant |
|---|---|---|
| $t_i$ | o11 | o12 |
| $\sim t_i$ | o21 | o22 |

FIG. 3

| RELEVANT WORD CORPUS | |
|---|---|
| DINOSAUR | 7 |
| METEOR | 4 |
| EXTINCTION | 3 |
| FOOD | 2 |
| PALEOZOIC | 1 |

| IRRELEVANT WORD CORPUS | |
|---|---|
| DINOSAUR | 1 |
| METEOR | 0 |
| EXTINCTION | 1 |
| FOOD | 8 |
| PALEOZOIC | 0 |
| CAR | 10 |
| SUMMER | 14 |
| BUILDING | 22 |
| DIPLOMA | 9 |
| FOUNTAIN | 3 |

FIG. 4

| TOPIC SIGNATURE SCORES | |
|---|---|
| DINOSAUR | 0.72 |
| METEOR | 0.39 |
| EXTINCTION | 0.21 |
| FOOD | 0.05 |
| PALEOZOIC | 0.84 |

|   | Target Lecture and Reading | GGW |
|---|---|---|
| ti | o11 | o12 |
| ~ti | o21 | o22 |

604

|   | Target Lecture | GGW |
|---|---|---|
| ti | o11 | o12 |
| ~ti | o21 | o22 |

606

|   | Target Lecture + Reading | *Other* prompt sources (Lecture+ Reading) |
|---|---|---|
| Ti | o11 | o12 |
| ~ti | o21 | o22 |

608

|   | Target Lecture | *Other* prompt sources (Lecture+ Reading) |
|---|---|---|
| ti | o11 | o12 |
| ~ti | o21 | o22 |

610

|   | Target Lecture | *Other* prompt sources (Lecture+Reading) + Reading of target prompt |
|---|---|---|
| ti | o11 | o12 |
| ~ti | o21 | o22 |

FIG. 6

SYSTEMS AND METHODS FOR DETERMINING THE EFFECTIVENESS OF SOURCE MATERIAL USAGE

CROSS-REFERENCE TO RELATED APPLICATIONS

This application claims priority to U.S. Provisional Application No. 62/240,789, filed Oct. 13, 2015, the entirety of which is herein incorporated by reference.

TECHNICAL FIELD

The technology described herein relates to automated essay scoring and more particular to evaluation of an essay's use of source materials.

BACKGROUND

Writing from sources is an important skill, and is of specific relevance to certain writing assessments that require test-takers to use sources in their responses, such as the TOEFL Integrated writing task, and Praxis Core Writing tasks that use sources. For example, the TOEFL Integrated task utilizes a rubric that specifically instructs test takers to use of important information from sources that include a reading portion and a spoken portion, with emphasis placed on the spoken (listening) portion. Scoring of responses is, in part, based on how well the test taker used the source materials in their essay response.

SUMMARY

Systems and methods are provided for automatically scoring essay responses to a prompt using a scoring model. A relevant word corpus and an irrelevant word corpus are accessed. A scoring model is generated by, for each of a plurality of words in the relevant word corpus, determining a topic signature score based on a number of appearances of that word in the relevant word corpus and a number of appearances of that word in the irrelevant word corpus. For each of a plurality of words in an essay response, a topic signature score is determined for that word. A score for the essay response is determined based on the identified topic signature scores.

As another example, a system for automatically scoring essay responses to a prompt using a scoring model includes a processing system comprising one or more data processors and a computer-readable medium encoded with instructions for commanding the processing system. In the method, a relevant word corpus and an irrelevant word corpus are accessed. A scoring model is generated by, for each of a plurality of words in the relevant word corpus, determining a topic signature score based on a number of appearances of that word in the relevant word corpus and a number of appearances of that word in the irrelevant word corpus. For each of a plurality of words in an essay response, a topic signature score is determined for that word. A score for the essay response is determined based on the identified topic signature scores.

As a further example, a computer-readable medium is encoded with instructions for commanding one or more data processors to execute a method for automatically scoring essay responses to a prompt using a scoring model. In the method, a relevant word corpus and an irrelevant word corpus are accessed. A scoring model is generated by, for each of a plurality of words in the relevant word corpus, determining a topic signature score based on a number of appearances of that word in the relevant word corpus and a number of appearances of that word in the irrelevant word corpus. For each of a plurality of words in an essay response, a topic signature score is determined for that word. A score for the essay response is determined based on the identified topic signature scores.

BRIEF DESCRIPTION OF THE FIGURES

FIG. 3 is a diagram depicting the four categorical values calculated by the topic signature reference generator for each word in the relevant word corpus.

FIG. 4 is a diagram depicting counts of words in the relevant word corpus and the irrelevant word corpus.

FIG. 5 is a diagram depicting example topic signature scores for each of the words in the relevant word corpus of FIG. 4.

FIG. 6 is a diagram depicting different types of source usage quality metrics that can be generated depending on what words are used to populate those corpuses.

DETAILED DESCRIPTION

Figure 1:
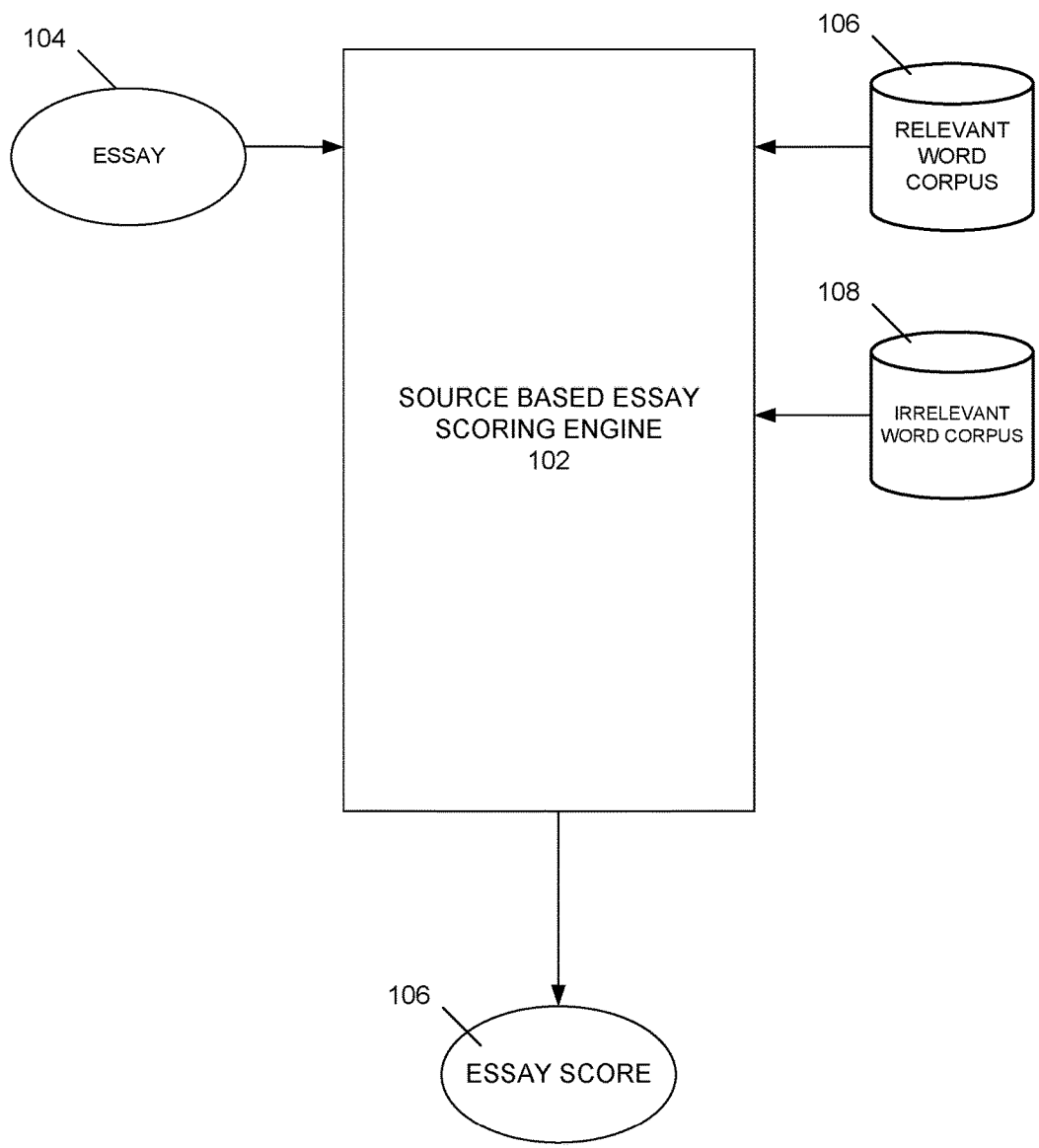
FIG. 1 is a block diagram depicting a computer-implemented source based essay scoring engine.

FIG. 1 is a block diagram depicting a computer-implemented source based essay scoring engine. A source based essay scoring engine 102 evaluates how well an essay 104 utilizes source materials that are provided to a test taker before or while the test taker is preparing the essay 104. In one example, a test taker is provided a reading portion that includes a passage of text. In certain examples, that reading portion is on a topic and provides one to three points directed to one side of an argument. The source materials further include a spoken lecture portion that is presented to the test taker via a video, an audio recording, or a live person speaking. In certain examples, that spoken portion includes one to three counter points directed to another side of that argument. The prompt then requests that the test taker summarize the main points in the spoken portion, where that spoken portion referenced the reading portion.

The source based essay scoring engine 102 receives an essay 104 and evaluates how well that essay 104 uses the source materials (e.g., the spoken portion and/or the reading portion described above) in the essay 104 to generate an essay score 106. That essay score 106, in one example, is an approximation of how a human scoring the essay 104 would have scored the essay 104 based, at least in part, on whether the essay 104 properly utilized the important portions of the source materials. Due to the cost of human scorers, the source based essay scoring engine 102 provides a fully automated scoring engine that, in certain embodiments, does not require any human intervention. In some embodiments, the source based essay scoring engine 102 provides essay scores 106 without any examples of human scored essays with which to train the scoring engine's scoring model, which greatly increases the speed in which prompts can be developed and implemented in live tests. The source based essay scoring engine 102, instead, generates its scoring model using a relevant word corpus 106 and an irrelevant word corpus 108, as described further herein. In certain examples, the relevant word corpus 106 includes words from the source materials, such as words from the spoken portion of the source materials and/or words from the reading portion of the source materials.

Figure 2:
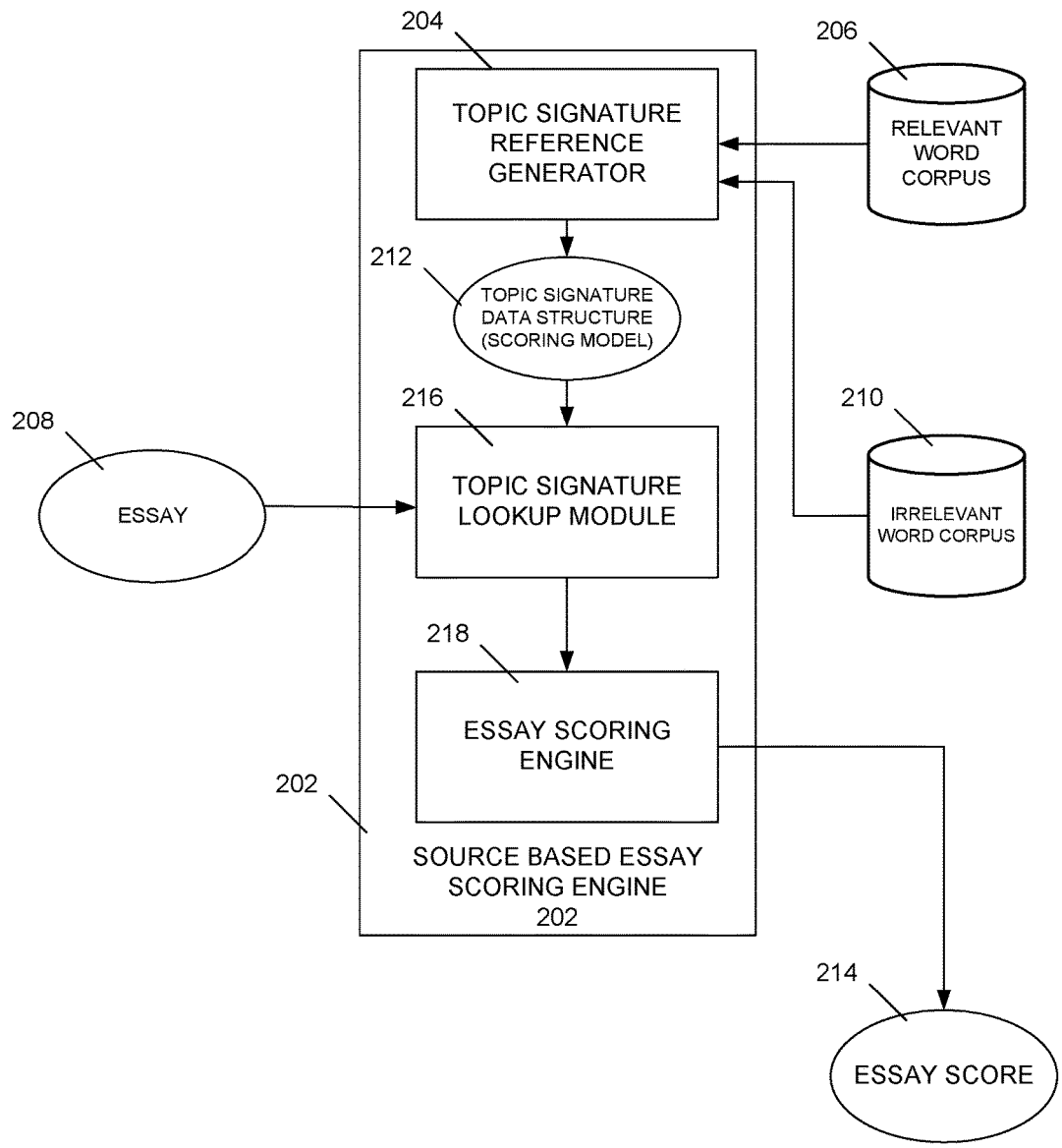
FIG. 2 is a block diagram depicting example components of a source based essay scoring engine.

FIG. 2 is a block diagram depicting example components of a source based essay scoring engine. The source based essay scoring engine 202 includes a topic signature reference generator 204 that identifies a value for each of a plurality of words in the relevant word corpus that indicates how well those relevant word corpus 206 words, when present in an essay 208 being scored, indicate that the test taker is using source materials in a quality manner in the essay 208. That is, when the essay 208 includes words having high topic signature values, that essay 208 is more likely to be of high quality, and is given a higher score accordingly. Conversely, when the essay 208 uses words having low topic signature values, that essay 208 is given a lower score because it is more likely to be of lower quality.

The topic signature reference generator 204 determines topic signatures for the words in the relevant word corpus 206 using frequencies of those words in the relevant word corpus (e.g., some or all of the source materials for an essay prompt) and frequencies of appearances of the words in the relevant word corpus in the irrelevant word corpus (e.g., the Gigaword corpus that comprises a dictionary that indicates word frequencies with each entry in the dictionary that indicate how commonly that word is used, such as in a corpus of books, newspapers, or other documents), as described further below. The topic signatures generated for words in the relevant word corpus (e.g., all of the words in the source materials, with function words such as articles and prepositions removed) are stored in a topic signature data structure 212 which is utilized as a scoring model.

In one embodiment, the source based essay scoring engine 202 utilizes all (or a portion) of words in the source materials as the relevant word corpus 206. For each of those source material words, the topic signature reference generator 204 calculates four values. FIG. 3 is a diagram depicting the four categorical values calculated by the topic signature reference generator 204 for each word in the relevant word corpus 206. For each word $t_i$ in the relevant word corpus 206 the topic signature reference generator calculates:

o11—the number of appearances of that word $t_i$ (or a stemmed version of that word) in the relevant word corpus 206 (e.g., the source materials);
o12—the number of appearances of that word $t_i$ in the irrelevant word corpus 210;
o21—the number of appearances of all other words in the relevant word corpus 206 in the relevant word corpus 206;
o22—the number of appearances of all other words in the relevant word corpus 206 in the irrelevant word corpus 210.

Using those four values and a value N indicating the sum of all appearances of all words in the relevant word corpus 206 and the irrelevant word corpus 210, topic signature reference generator calculates a topic signature data structure 212 that includes an entry and topic signature score for each word in the relevant word corpus 206. In one example, a topic signature score for a word in the relevant word corpus 2016 is calculated according to:

$$\text{Topic Signature Score} = -2((o11+o21)\log(p)+(o12+o22)\log(1-p))-(o11\ \log(p1)+o12\ \log(1-p1)+o21\ \log(p2)+o22\ \log(1-p2))$$

where o11 is based on the number of times the particular word appears in the relevant word corpus, o12 is based on the number of times the particular word appears in the irrelevant word corpus, 021 is based on the number of times other words appear in the relevant word corpus, 022 is based on the number of times other words appears in the irrelevant word corpus, where p is based on o11, o12, and a sum of appearances of all words in the relevant word corpus and the irrelevant word corpus (N), where p1 is based on o11 and o21, and wherein p2 is based on o12 and o22. In one example, p=(o11+o12)/N; p1=o11/(o11+o21); and p2=o12/(o12+o22).

The topic signature score for a particular word indicates how well the appearance of that particular word in an essay 208 indicates that the essay 208 is effectively using source materials. The topic signature score first captures how often that particular word appears in relevant materials compared to irrelevant materials. If the particular word appears often in the relevant materials (e.g., the source materials) but does not appear often in irrelevant materials (e.g., other unrelated documents), then the particular word is an important word. The topic signature score further captures how common the particular word is compared to other words. If the particular word is a very common word, then its use in the essay 208 may not be as strong of an indicator of quality source material usage.

FIG. 4 is a diagram depicting counts of words in the relevant word corpus and the irrelevant word corpus. In the example of FIG. 4, the source materials are related to dinosaurs and their extinction. The source materials are processed to extract the words in the relevant word corpus (e.g., by filtering certain words such as articles and prepositions), and a count of a number of times those words appear in the source materials is calculated. The irrelevant word corpus indicates a number of words and how often words appear. In one example described above, the Gigaword corpus is used, which identifies words and their relative frequency of use. In other examples, an actual corpus of one or more documents (e.g., New York Times newspaper editions over a period of a number of years) is processed to identify words and the number of times those words appear in the corpus. As shown in the irrelevant word corpus, certain of the words that appear in the relevant word corpus also appear in the irrelevant word corpus. Conversely, some irrelevant word corpus words do not appear in the relevant word corpus.

Using the values stored in or extracted from the relevant word corpus 206 and the irrelevant word corpus 210, the topic signature reference generator 204 calculates a topic signature score for each word in the relevant word corpus 206 and stores those topic signature scores in the topic signature data structure 212. FIG. 5 is a diagram depicting example topic signature scores for each of the words in the relevant word corpus of FIG. 4.

Having generated the topic signature data structure scoring model 212, the source based essay scoring engine 202 is able to determine essay scores 214 for received essays 208. In the example of FIG. 2, an essay 208 to be scored is received at a topic signature lookup module 216. The topic signature lookup module 216 iterates through each word in the essay 208 (in one example not iterating through repeated words). For each word in the essay 208, the lookup module 216 determines whether a corresponding word appears in the topic signature data structure 212. If that word appears in the data structure 212, a count of total words in the essay 208 that have topic signature scores is increased, and a score numerator is increased by the corresponding topic signature score for that word. Once all words of the essay are processed by the lookup module, a topic signature quality score for the entire essay 208 is determined based on the score numerator divided by the count of total words in the essay 208. That topic signature quality score for the entire essay 208 is provided to an essay scoring engine 218, which generates the essay score 214 for the essay 208 based on the topic signature quality score alone, or in combination with other quality metrics (e.g., a grammar quality metric) determined for the essay 208, such as using a weighted sum or regression.

The topic signature quality score for an essay is dependent on the relevant word corpus and the irrelevant word corpus used in generating the topic signature data structure. FIG. 6 is a diagram depicting different types of source usage quality metrics that can be generated depending on what words are used to populate those corpuses. In a first example 602, all source materials (e.g., the reading portion and the spoken portion) are used to populate the relevant word corpus, while the Gigaword corpus is used as the irrelevant word corpus. In a second example 604, the spoken portion of the source materials is used as the relevant word corpus, while the Gigaword corpus is used as the irrelevant word corpus. In a next example 606, all source materials (e.g., the reading portion and the spoken portion) are used to populate the relevant word corpus, while source materials from other essay prompts are used to populate the irrelevant word corpus. In a further example 608, the spoken portion of the source materials is used as the relevant word corpus, while source materials from other essay prompts are used to populate the irrelevant word corpus. In a final example 610, the spoken portion of the source materials is used as the relevant word corpus, while source materials from other essay prompts and the reading portion of the source materials for the present prompt are used to populate the irrelevant word corpus.

Figure 7:
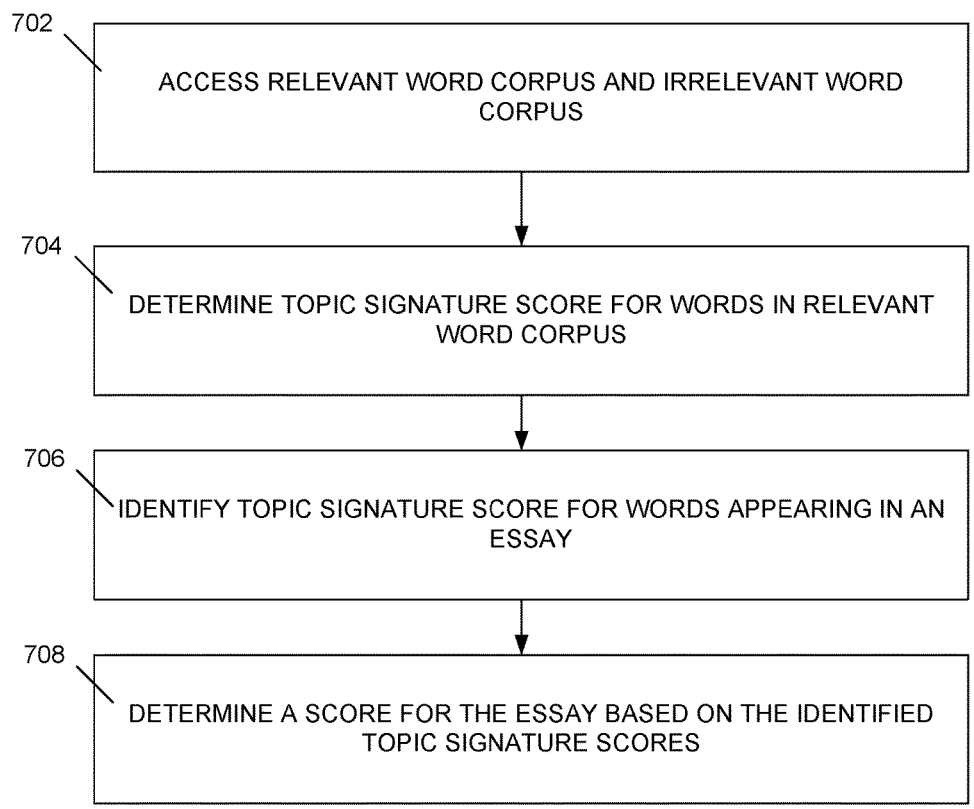
FIG. 7 is a flow diagram depicting a processor-implemented method for automatically scoring essay responses to a prompt using a scoring model.

FIG. 7 is a flow diagram depicting a processor-implemented method for automatically scoring essay responses to a prompt using a scoring model. At 702, a relevant word corpus and an irrelevant word corpus are accessed. At 704, a scoring model (e.g., a partial scoring model that generates a portion of the scoring-relevant metrics or a complete scoring model) is generated by, for each of a plurality of words in the relevant word corpus, determining a topic signature score based on a number of appearances of that word in the relevant word corpus and a number of appearances of that word in the irrelevant word corpus. For each of a plurality of words in an essay response, at 706, a topic signature score is determined for that word. At 708, a score for the essay response is determined based on the identified topic signature scores, alone or in combination with other feature scores.

Figure 8A:
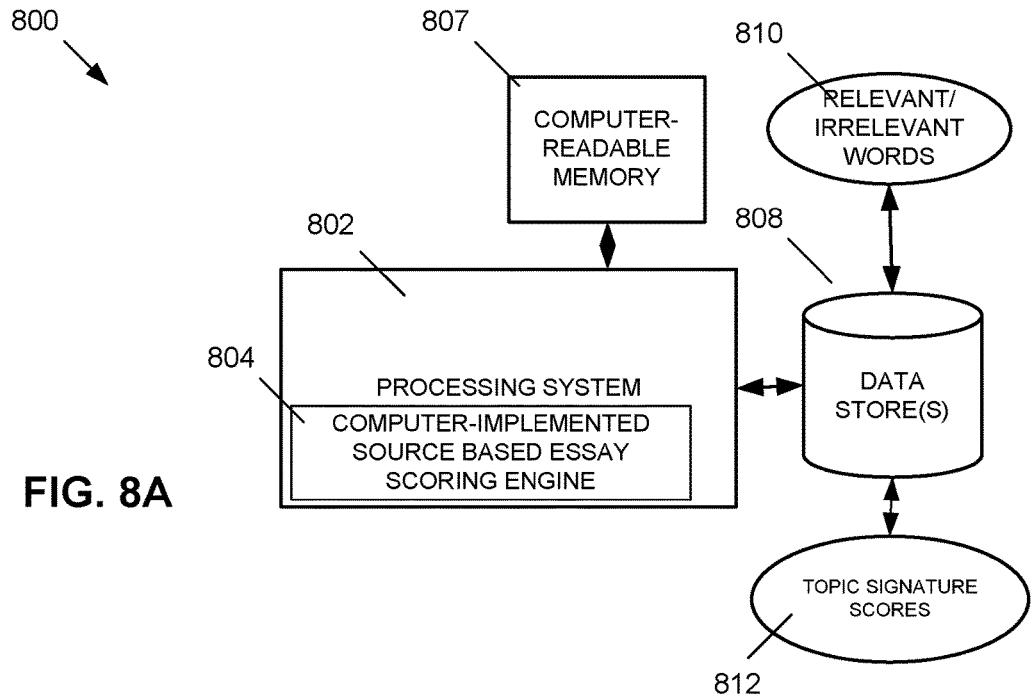
FIGS. 8A, 8B, and 8C depict example systems for implementing the approaches described herein for automatically scoring essay responses to a prompt using a scoring model.
Figure 8B:
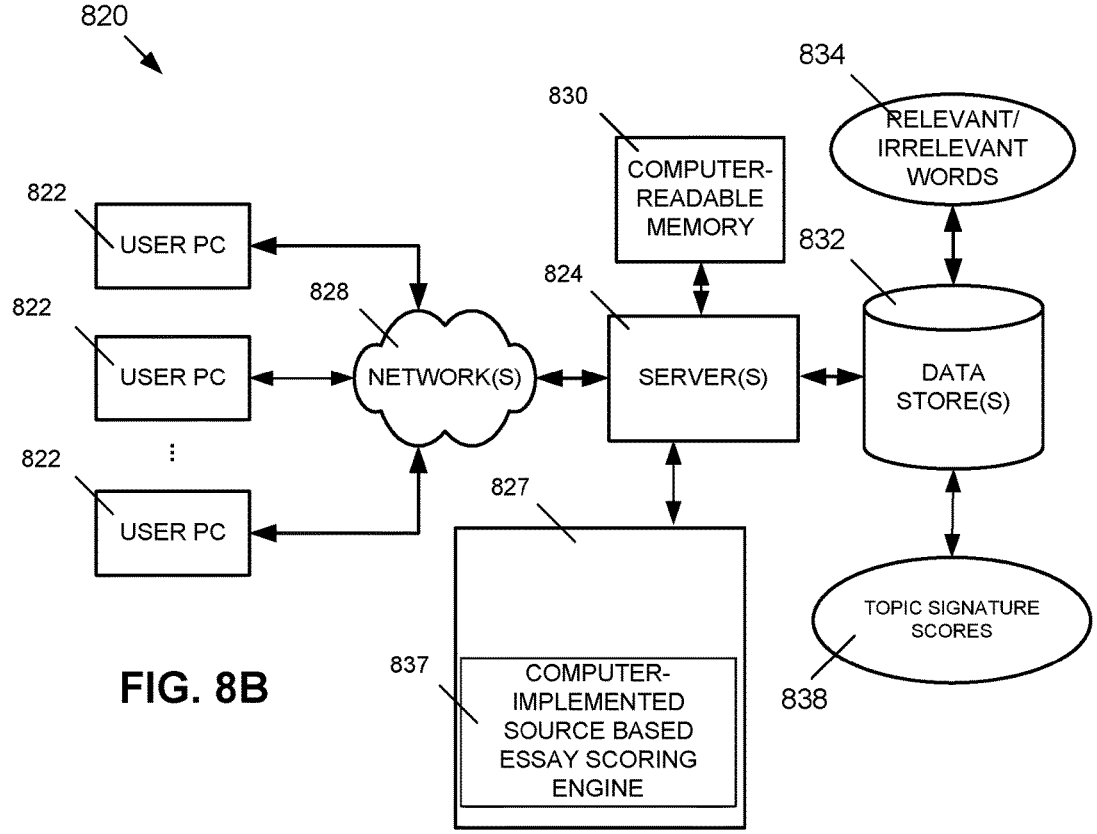
Figure 8C:
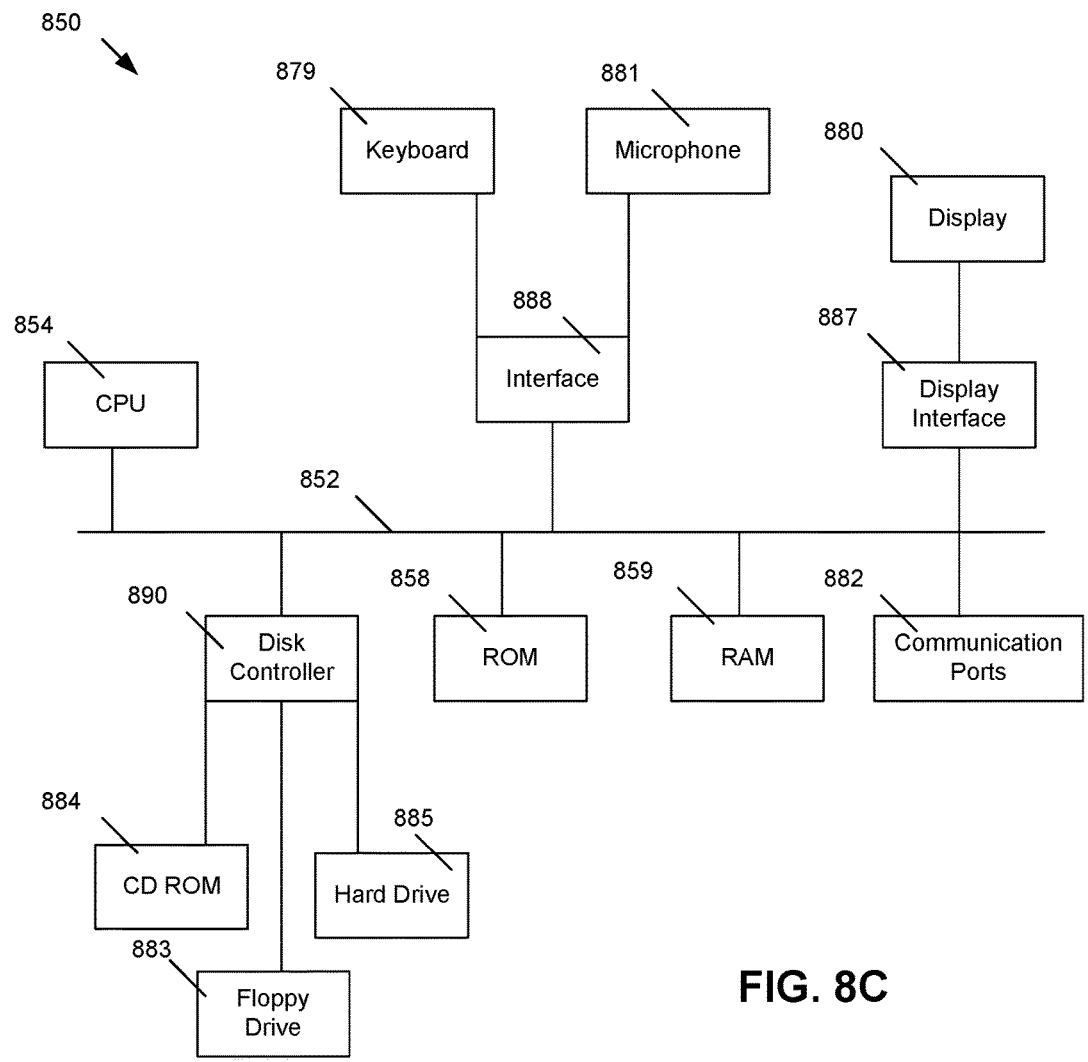

FIGS. 8A, 8B, and 8C depict example systems for implementing the approaches described herein for automatically scoring essay responses to a prompt using a scoring model. For example, FIG. 8A depicts an exemplary system 800 that includes a standalone computer architecture where a processing system 802 (e.g., one or more computer processors located in a given computer or in multiple computers that may be separate and distinct from one another) includes a computer-implemented source based essay scoring engine 804 being executed on the processing system 802. The processing system 802 has access to a computer-readable memory 807 in addition to one or more data stores 808. The one or more data stores 808 may include relevant/irrelevant words 810 as well as topic signature scores 812. The processing system 802 may be a distributed parallel computing environment, which may be used to handle very large-scale data sets.

FIG. 8B depicts a system 820 that includes a client-server architecture. One or more user PCs 822 access one or more servers 824 running a source based essay scoring engine 837 on a processing system 827 via one or more networks 828. The one or more servers 824 may access a computer-readable memory 830 as well as one or more data stores 832. The one or more data stores 832 may include relevant/irrelevant words 834 as well as topic signature scores 838.

FIG. 8C shows a block diagram of exemplary hardware for a standalone computer architecture 850, such as the architecture depicted in FIG. 8A that may be used to include and/or implement the program instructions of system embodiments of the present disclosure. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 858 and random access memory (RAM) 859, may be in communication with the processing system 854 and may include one or more programming instructions for performing the method of automatically scoring essay responses to a prompt using a scoring model. Optionally, program instructions may be stored on a non-transitory computer-readable storage medium such as a magnetic disk, optical disk, recordable memory device, flash memory, or other physical storage medium.

In FIGS. 8A, 8B, and 8C, computer readable memories 807, 830, 858, 859 or data stores 808, 832, 883, 884, 888 may include one or more data structures for storing and associating various data used in the example systems for automatically scoring essay responses to a prompt using a scoring model. For example, a data structure stored in any of the aforementioned locations may be used to store data from XML files, initial parameters, and/or data for other variables described herein. A disk controller 890 interfaces one or more optional disk drives to the system bus 852. These disk drives may be external or internal floppy disk drives such as 883, external or internal CD-ROM, CD-R, CD-RW or DVD drives such as 884, or external or internal hard drives 885. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 890, the ROM 858 and/or the RAM 859. The processor 854 may access one or more components as required.

A display interface 887 may permit information from the bus 852 to be displayed on a display 880 in audio, graphic, or alphanumeric format. Communication with external devices may optionally occur using various communication ports 882.

In addition to these computer-type components, the hardware may also include data input devices, such as a keyboard 879, or other input device 881, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A processor implemented method of automatically scoring essay responses to a prompt using a scoring model, comprising:
   accessing a relevant word corpus and an irrelevant word corpus;
   generating a scoring model by, for each of a plurality of words in the relevant word corpus:
      determining a topic signature score based on a number of appearances of that word in the relevant word corpus and a number of appearances of that word in the irrelevant word corpus;
   for each of a plurality of words in an essay response:
      identifying a topic signature score for that word;
      determining a score for the essay response based on the identified topic signature scores,
   wherein the plurality of words in the relevant word corpus includes less than all of the words appearing in the relevant word corpus.

2. The method of claim 1, wherein the prompt instructs an essay writer to draft the essay using source materials.

3. The method of claim 2, wherein the relevant word corpus is based on words appearing in the source materials, and wherein the irrelevant word corpus is based on a word frequency dictionary.

4. The method of claim 2, wherein the source materials comprise a spoken portion that is provided live, via video, or via audio, and a reading portion.

5. The method of claim 4, wherein the relevant word corpus is based on words appearing in the spoken portion and words appearing in the reading portion, and wherein the irrelevant word corpus is based on a word frequency dictionary.

6. The method of claim 4, wherein the relevant word corpus is based on words appearing in the spoken portion, and wherein the irrelevant word corpus is based on a word frequency dictionary.

7. The method of claim 4, wherein the relevant word corpus is based on words appearing in the spoken portion and words appearing in the reading portion, and wherein the irrelevant word corpus is based on source materials for a different prompt.

8. The method of claim 4, wherein the relevant word corpus is based on words appearing in the spoken portion, and wherein the irrelevant word corpus is based on words appearing in a spoken portion and words appearing in a reading portion materials for a different prompt.

9. The method of claim 4, wherein the relevant word corpus is based on words appearing in the spoken portion, and wherein the irrelevant word corpus is based on words appearing in a spoken portion and words appearing in a reading portion materials for a different prompt and words appearing in the reading portion of the prompt.

10. The method of claim 1, wherein the topic signature score for a particular word is further based on a number of times other words appear in the relevant word corpus and a number of times other words appear in the irrelevant word corpus.

11. The method of claim 10, wherein the topic signature score for the particular word is determined according to:

$$\text{Topic Signature Score} = -2((o11+o21)\log(p)+(o12+o22)\log(1-p))-(o11\log(p1)+o12\log(1-p1)+o21\log(p2)+o22\log(1-p2))$$

where $o11$ is based on the number of times the particular word appears in the relevant word corpus, $o12$ is based on the number of times the particular word appears in the irrelevant word corpus, $o21$ is based on the number of times other words appear in the relevant word corpus, $o22$ is based on the number of times other words appears in the irrelevant word corpus, where $p$ is based on $o11$, $o12$, and a sum of appearances of all words in the relevant word corpus and the irrelevant word corpus ($N$), where $p1$ is based on $o11$ and $o21$, and wherein $p2$ is based on $o12$ and $o22$.

12. The method of claim 11, wherein:

$$p=(o11+o12)/N;$$

$$p1=o11/(o11+o21);$$

$$p2=o12/(o12+o22).$$

13. The method of claim 1, wherein determining the score includes:
   determining words in the essay response having topic signature scores;
   summing topic signature scores for words having topic signature scores to form a sum;
   dividing the sum by a number of words in the essay having topic signature scores.

14. The method of claim 1, wherein the scoring model is trained without the use of scores from human scored essays.

15. The method of claim 1, wherein the scoring model is trained without the use of scores from previously scored responses to the prompt.

16. The method of claim 1, wherein the scoring model is trained without the use of scores from previously scored responses to any prompt.

17. A system for automatically scoring essay responses to a prompt using a scoring model, comprising:
- a processing system comprising one or more data processors;
- a non-transitory computer-readable memory encoded with instructions for commanding the processing system to execute steps that include:
  - accessing a relevant word corpus and an irrelevant word corpus;
  - generating a scoring model by, for each of a plurality of words in the relevant word corpus:
    - determining a topic signature score based on a number of appearances of that word in the relevant word corpus and a number of appearances of that word in the irrelevant word corpus;
  - for each of a plurality of words in an essay response:
    - identifying a topic signature score for that word;
  - determining a score for the essay response based on the identified topic signature scores,
  - wherein the plurality of words in the relevant word corpus includes less than all of the words appearing in the relevant word corpus.

18. The system of claim 17, wherein the scoring model is trained without the use of scores from human scored essays or previously scored responses to the prompt.

19. A non-transitory computer-readable medium encoded with instructions for commanding a processing system comprising one or more data processors to execute steps of a method for automatically scoring essay responses to a prompt using a scoring model, the method including:
- accessing a relevant word corpus and an irrelevant word corpus;
- generating a scoring model by, for each of a plurality of words in the relevant word corpus:
  - determining a topic signature score based on a number of appearances of that word in the relevant word corpus and a number of appearances of that word in the irrelevant word corpus;
- for each of a plurality of words in an essay response:
  - identifying a topic signature score for that word;
- determining a score for the essay response based on the identified topic signature scores,
- wherein the plurality of words in the relevant word corpus includes less than all of the words appearing in the relevant word corpus.

20. The non-transitory computer-readable medium of claim 19, wherein the scoring model is trained without the use of scores from human scored essays or previously scored responses to the prompt.

* * * * *